(Model.)

4 Sheets—Sheet 1.

H. RABE.
ELECTRIC WINDING FOR TORSION PENDULUM CLOCKS.

No. 401,065.

Patented Apr. 9, 1889.

WITNESSES:
Fred G. Dieterich
Amos W. Hart

INVENTOR:
Heinrich Rabe
BY Munn & Co
ATTORNEYS.

(Model.) 4 Sheets—Sheet 2.
H. RABE.
ELECTRIC WINDING FOR TORSION PENDULUM CLOCKS.

No. 401,065. Patented Apr. 9, 1889.

WITNESSES:
Fred G. Dieterich
Amos W. Hart

INVENTOR:
Heinrich Rabe
BY
ATTORNEYS.

(Model.) 4 Sheets—Sheet 3.
H. RABE.
ELECTRIC WINDING FOR TORSION PENDULUM CLOCKS.
No. 401,065. Patented Apr. 9, 1889.
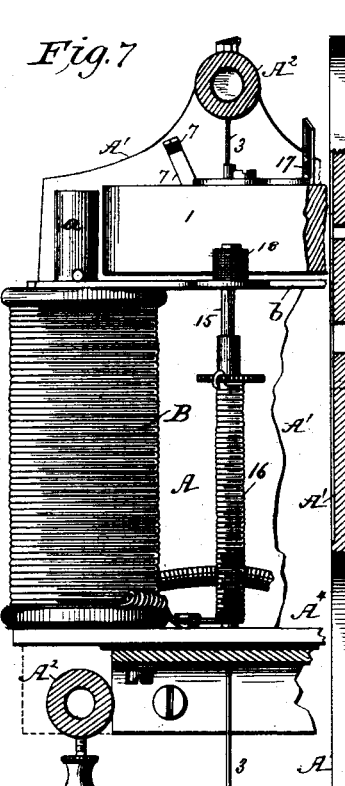
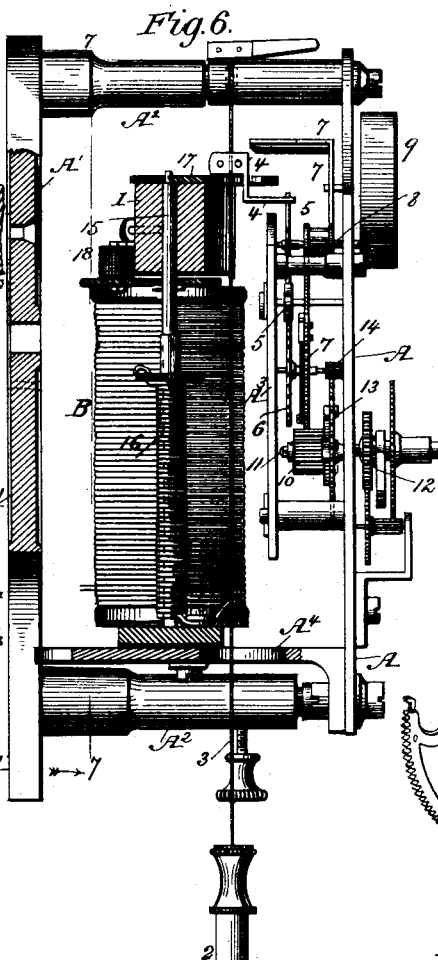
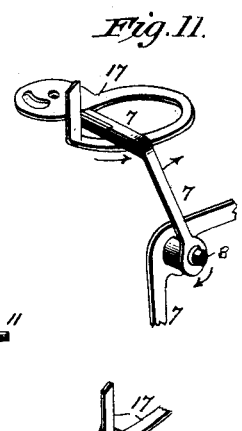
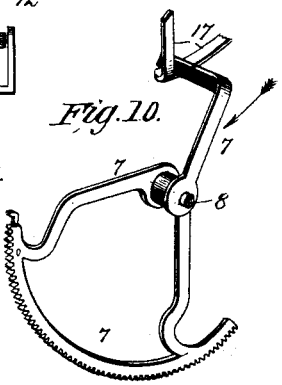
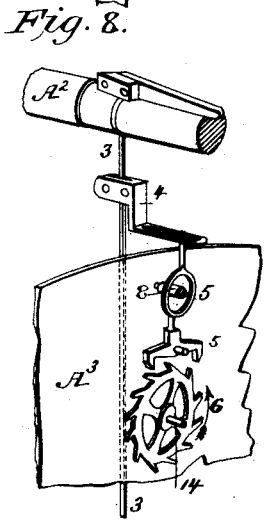
WITNESSES:
Fred G. Dieterich
Amos W. Hart
INVENTOR:
Heinrich Rabe
BY Munn & Co
ATTORNEYS.

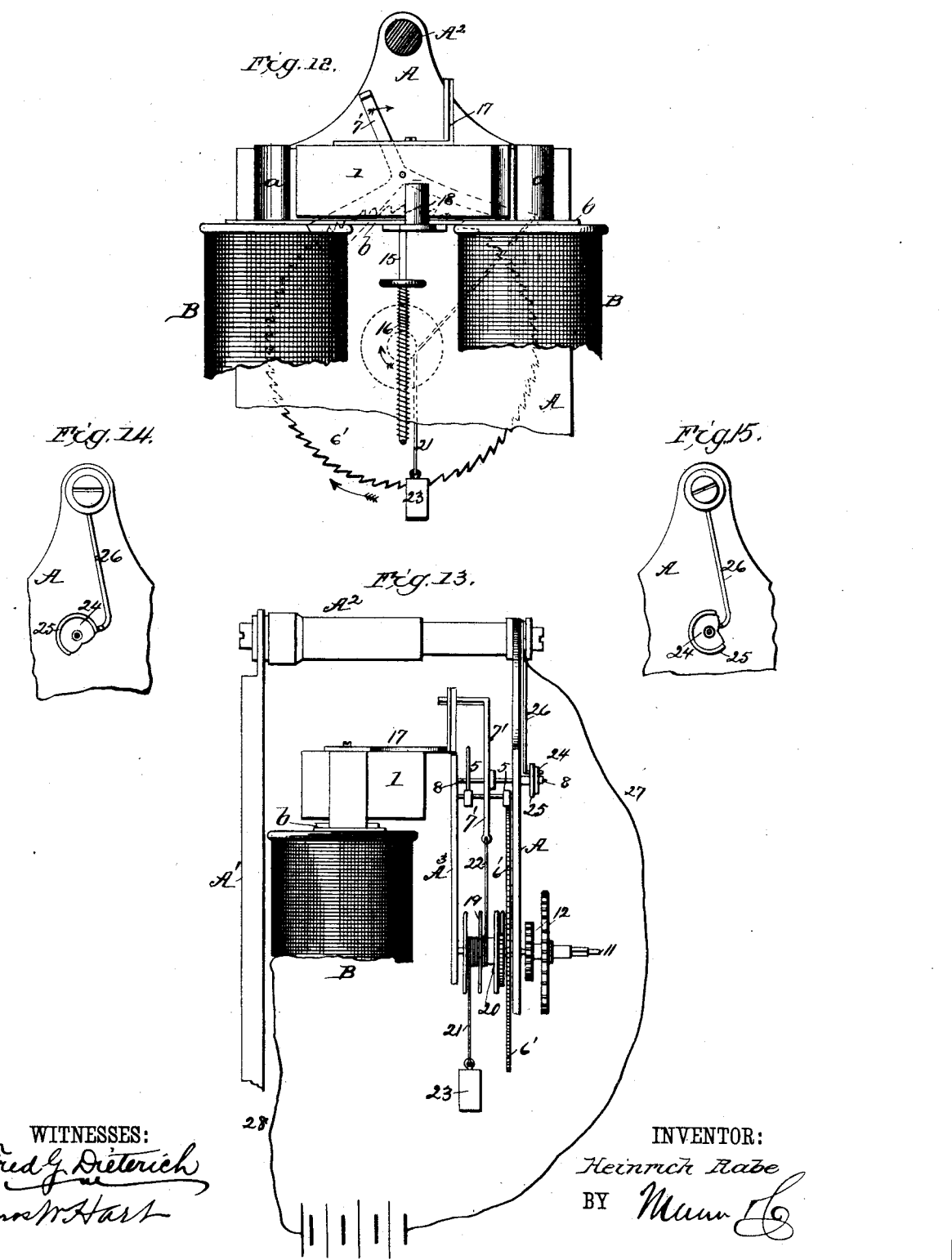

UNITED STATES PATENT OFFICE.

HEINRICH RABE, OF HANAU, GERMANY, ASSIGNOR TO THE HANAUER ELECTRISCHE UHREN FABRIK STEINHEUER RABE, OF SAME PLACE.

ELECTRIC WINDING FOR TORSION-PENDULUM CLOCKS.

SPECIFICATION forming part of Letters Patent No. 401,065, dated April 9, 1889.

Application filed August 31, 1887. Serial No. 248,329. (Model.)

*To all whom it may concern:*

Be it known that I, HEINRICH RABE, a subject of the Emperor of Germany, and a resident of Hanau, Germany, have invented a new and useful Improvement in Electrical Clock-Winding Mechanism, of which the following is a full, clear, and exact description.

The invention is an improved electrical mechanism or apparatus for winding clocks having torsion or rotary pendulums. The said mechanism or apparatus is adapted for raising the weight or resetting a spring which drives the clock-work. When the actuating-weight has reached the limit of its descent, a lever is thrown into contact with an arm secured to the pivoted armature, thus completing the electrical circuit, so that the magnetic coils are energized and the armature attracted and caused to swing, thus carrying the lever back to its original or starting position and raising the weight until the circuit is broken, when the armature returns to its normal position of rest, and the weight is left free to begin its downward movement *de novo*.

In the accompanying drawings (four sheets) the first eleven figures illustrate my preferred embodiment of the invention, and the remaining figures (displayed on Sheet 4) illustrate a modification.

Figure 1:
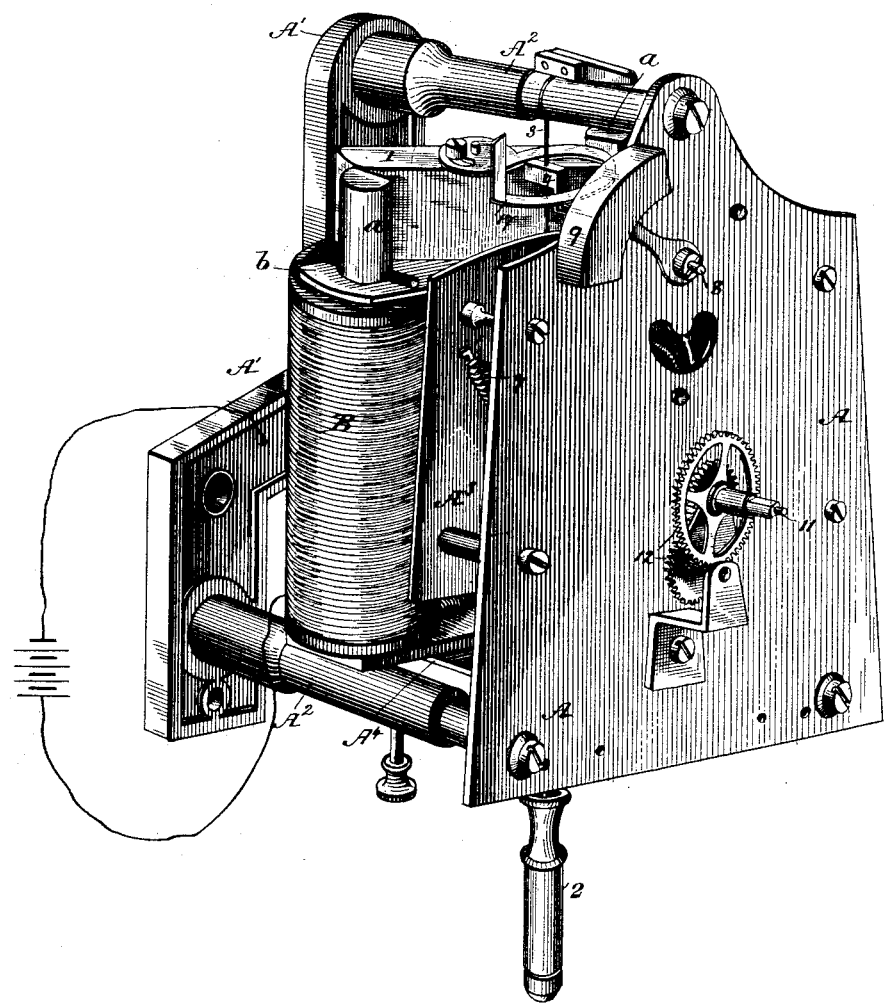
Figure 2:
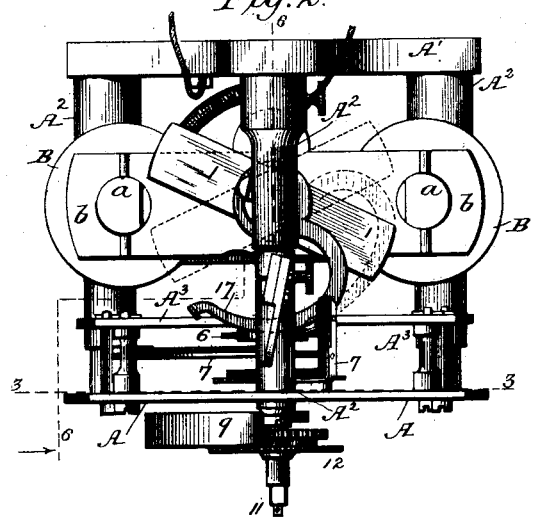
Figure 4:
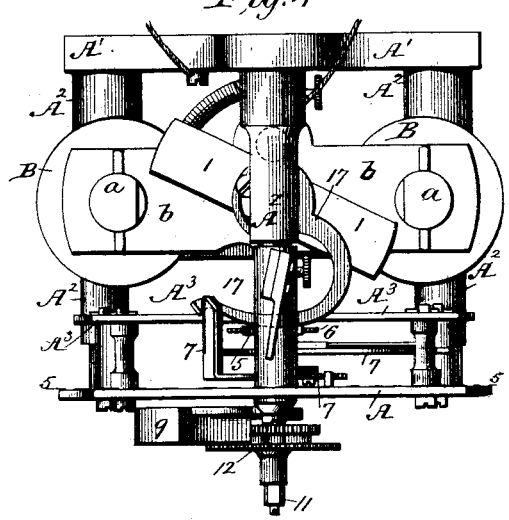
Figure 3:
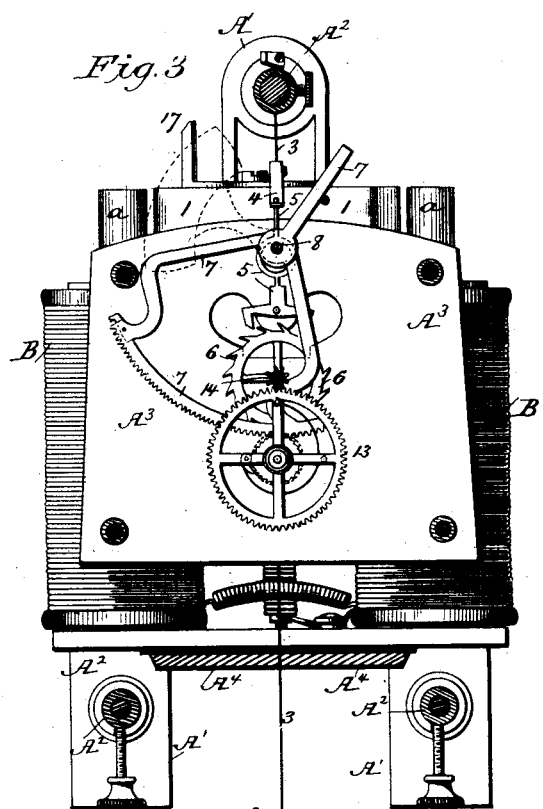
Figure 5:
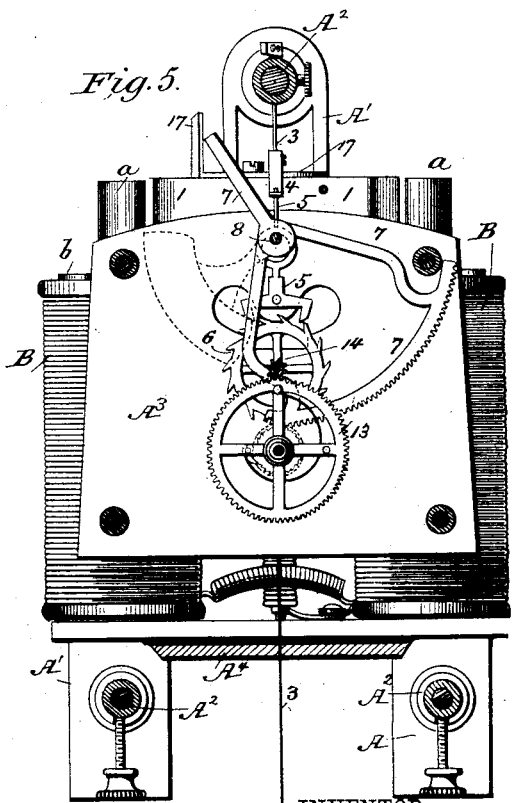

Figure 1 is a perspective view of my preferred form of the invention, in connection with certain portions of a clock. Fig. 2 is a plan view of the same, showing the rack-lever in its starting position. Fig. 3 is a vertical section on line 3 3 of Fig. 2. Fig. 4 is a plan view showing the starting-lever at the end of its movement. Fig. 5 is a vertical section on line 5 5 of Fig. 4. Fig. 6 is a vertical section on line 6 6 of Fig. 2. Fig. 7 is a vertical section on line 7 7, Fig. 6. Fig. 8 is a detail perspective view showing the connection of the escape-lever and pendulum. Fig. 9 is a perspective view of the rack-lever and the weight rigidly connected therewith. Figs. 10 and 11 are perspective views showing the rack-lever and curved arm at the beginning and end of their movement. Fig. 12, Sheet 4, is a sectional view of a modification of the form of apparatus illustrated in the preceding figures. Fig. 13 is a side view of the same. Figs. 14 and 15 are detail views of the circuit maker and breaker.

The frame of the clock and other fixed parts are indicated by letters and the movable parts by numerals. As best shown in Figs. 1 and 6, the frame consists, mainly, of a vertical front plate, A, a parallel back plate or standard, A', and transverse connecting-bars $A^2$. Behind the said front plate, A, and separated from it by a narrow space, is arranged a shorter parallel plate, $A^3$, the two being rigidly connected by short bars, as shown. There is also a base-plate, $A^4$, upon which the two electro-magnets B B are supported vertically. The cores $a$ of these magnets project above the coils, and a horizontal plate, $b$, yokes them rigidly together. The straight bar-armature 1 is arranged above and parallel to this plate and mounted on a vertical spindle which passes up through the latter, Figs. 6 and 7.

The torsion-pendulum 2 is suspended by a rod, 3, from the top bar, $A^2$, of the frame in the space between the supplemental front plate, $A^3$, and the magnets B, the base-plate $A^4$ (see Fig. 6) being provided with a circular opening, Fig. 6, to permit due oscillation of the said rod 3. A clamp, 4, (see especially Fig. 6,) having a horizontal slotted arm, is affixed to said rod 3 a short distance below its point of suspension and serves as the means of connection between the pendulum and the escapement—that is to say, the scape-lever 5 is pivoted vertically to the inner side of plate $A^3$ just above the scape-wheel 6, and its upper end works in the slot of the aforesaid clamp 4, thus imparting motion to the pendulum.

The device 7, Fig. 9, which for convenience I term the "rack-lever," is, in fact, a geared sector, (see Fig. 7,) having a right-angular arm extending from its apex. This lever is pivoted vertically between the upper portions of the aforesaid plates A A on the same axis, 8, as the segmental weight 9, which operates the clock-work. One end of this axis passes through a circular opening in the scape-lever 5 (see Fig. 8) and has its bearing in plate $A^3$, while the weight 9 is affixed to the other end, that projects through the front plate, A. Said weight 9 is keyed fast on the axis 8, so that it and the rack-lever 7 vibrate together, the extent of movement being about one-sixth of a circle, as indicated by dotted lines, Figs. 3 and 5. The said weight actuates the clock-work through the medium of the said lever 7 and a pinion, 10, as I will now describe.

The pinion 10 is mounted free on a horizontal shaft, 11, which actuates the clock-hands (not shown) through the ordinary gearing 12, Figs. 1 and 6, to which latter further reference is unnecessary.

For convenience of description I will hereinafter term the shaft 11 the "dial-shaft."

The pinion 10 has a ratchet-connection with a spur-gear, 13, Fig. 6, which meshes with a pinion, 14, fixed on a shaft, 15, arranged above and parallel to the shaft 11 and carrying the scape-wheel 6, before referred to. It will now be understood that when the weight 9 falls from its highest position (best shown in Figs. 1 and 6) to its lowest position it carries the rack-lever 7 with it, and the latter consequently rotates the pinion 10, and thereby drives the train 12, that actuates the dial-work; but through the gear 13, pinion 14, and scape-wheel 6 a vibratory movement is imparted to the scape-lever 5, by which latter (by its connection with the slotted clamp-piece 4, attached to the pendulum-rod 3) the pendulum itself is vibrated, and thus performs the usual regulative function of such device. When the weight 9 has reached the lower limit of its gravitating movement, it must obviously be returned to its original elevated position in order to continue to perform its function. It is for this purpose that my electrical mechanism is employed. As before stated, the armature 1 is fixed on a vertical rotary axis, 15, Fig. 6, around which is coiled a spiral spring, 16, Figs. 6 and 7, whose function is to tend to hold the armature 1 in a certain normal diagonal position (shown in full lines in several figures) until its tension shall be overcome by magnetic attraction, as will be presently described. A curved or C-shaped arm, 17, having its free end vertical, is attached to the upper side of the armature 1 by means of a screw passing through a slot, which permits horizontal adjustment of said arm 17, as required. Normally the arm occupies the position shown in full lines—that is to say, its free end being curved around the pendulum-rod 3 and its upwardly-bent end engaging or in readiness to engage the horizontal arm of the rack-lever 7.

The armature 1 is held against a rubber or other insulating-block, 18, Figs. 6 and 7, by the tension of the spring 16. The clock-work, the magnets B, and armature 1 are properly insulated from each other. One conducting-wire of a battery connects with the clock-work, while the other connects with the coils of magnets B. Normally the circuit is broken and no current traverses the coils save when the lever 7 and arm 17 are in contact. As best shown in Fig. 9, a rubber block or other insulating-piece is attached to the under side of the horizontal arm of the rack-lever 7. When the weight 9 has run down and thrown the rack-lever 7 into the position shown in Figs. 4, 5, and 11, the metallic portion of the angular arm of the lever comes into contact with the arm 17, thereby completing the circuit, so that a current instantly energizes the coils B B, thereby causing the poles $a$ to attract the adjacent ends of the pivoted armature 1 and turn it on its pivot 15, so that it swings to the opposite diagonal position shown by dotted lines, Fig. 2. In making this movement the armature necessarily carries the curved arm 17 with it, and it in turn moves the rack-lever 7 back to its original or starting position, (shown in full lines, Figs. 2, 3, 6, and 10;) but at the instant such position is reached the vertical portion of arm 17 passes from contact with the metallic portion of lever 7 into contact with the insulating-piece, (see Fig. 10,) so that the electric circuit and current are no longer broken. Then, the poles $a\,a$ being no longer magnetic, the spring 16 on shaft 15, Figs. 6 and 7, returns the armature 1 to its original position, Fig. 4, and the weight 9 and lever 7 begin their arc movement anew. Thus the operation goes on continually, the circuit being alternately made and broken—i. e., made when the weight 9 reaches its downward limit, Figs. 4 and 5, and broken when restored to its elevated place, Figs. 1, 2, and 3—while the operation of the clock-work proceeds uninterruptedly.

In place of the weight 9, I may employ a coiled spring.

I will now describe the modification shown in Figs. 12, 13, 14, and 15, Sheet 4.

The frame, the magnets, armature 1, curved arm 17, its pivot-shaft 15, spring 16, and devices for connecting with the pendulum-rod are constructed and arranged substantially the same as before described. On the dial-shaft 11 are fixed two rigidly-connected drums, 19 20, on which cords 21 22 are wound in opposite directions. One cord, 21, suspends a weight, 23, which drives the clock-work, and the other, 22, connects with one arm of a lever, 7', which has an opposite weighted arm for holding it in position to keep the cord 22 taut. In other respects the lever 7' is constructed like the rack-lever 7, before described, and it is similarly pivoted by means of a shaft, 8.

A large escapement-wheel, 6', is mounted on the dial-shaft 11, and an escape-lever, 5, coacts with this wheel, and is connected with the pendulum-rod by means of a clamp, (not shown,) as in the mechanism first described. This escape-wheel 6' is connected by ratchet and pawl with the drums 19 and 20, so that the latter carry the escape-wheel with them when the weight 23 descends, but not when it is raised, and the weight-cord 22 is rewound on the drum.

On the outer end of the axis of the lever 7' are fixed two notched disks, 24 25, Figs. 14 and 15, the smaller one, 24, being made of conducting and the other or larger one, 25, of a non-conducting material. The notch in disk 24 is the smaller. A spring-rod, 26, having its lower end bent outward and bearing normally on the larger disk, is secured to the frame-plate A and connected by a wire, 27, with one element of a battery, while the other conductor, 28, is connected with the magnet-coils B. As the weight 23 descends, the drums and escape-wheel 6' rotate together, as indicated by arrows, Fig. 1, the cord 22 being wound on the drum as the other, 21, unwinds, and the lever 6' is tilted or thrown over into contact with the curved arm 17, thus completing the circuit, so that the armature 1 swings into alignment with the poles a a and carries the lever 7' back to its original or starting position, (shown in Fig. 1,) thus rotating the drums 19 20 backward and winding up the weight-cord 21. The disks 24 25 rotate with the axis 8 of lever 7', and the circuit is completed by the bent arm of the spring-rod 26 passing into the notches of said disks, as shown in Fig. 15, whereby said rod comes in contact with the smaller or conducting disk 24. When the lever 7' is thrown back by the armature-arm 17, as above stated, the bent end of the spring-rod 26 passes out of the notches of the disks and bears again on the periphery of the larger or non-conducting one, 25, as shown in Fig. 14, and thus the circuit is broken.

What I claim, and desire to secure by Letters Patent, is—

1. In an electrical clock-winding apparatus, the combination, with the dial-work shaft, of electro-magnets forming part of an electric circuit, a pivoted swinging spring-retracted armature, an arm attached to and moving with the latter, a pivoted lever connected with the aforesaid shaft, and one part of which has a non-conducting portion and projects into the path traversed by the armature-arm, a weight connected with the pivoted lever, and conductors connecting the winding mechanism and magnetic coils with a battery, substantially as shown and described, whereby when the weight shall have run down the projecting portion of the lever comes in contact with the armature-arm, thus completing the electrical circuit, so that the armature turns and carries the lever back to its starting position, and also raises the weight, as specified.

2. In an electrical clock-winding apparatus, the combination, substantially as shown and described, with a swinging arm forming part of an electro-magnetic circuit, of a pivoted vibrating lever having a conducting and non-conducting portion which engages the aforesaid arm and alternately makes and breaks the circuit at the limits of movement of said lever, a weight, and a clock-work mechanism, with both of which said lever is connected, whereby the said weight is raised when the lever is returned to its starting position, as specified.

3. In an electrical clock-winding apparatus, the combination, with the electro-magnets forming part of an electrical circuit, a spring-retracted armature pivoted between their poles and having an arm attached, the segmental rack-lever and a weight, both fixed on the same rotatable axis, and said lever having a laterally-projecting portion, to which a non-conducting piece is secured, the dial-work shaft, and a pinion mounted loose on the same and meshing with the aforesaid lever, escape mechanism, the pendulum, and a piece connecting said escape mechanism with the pendulum-rod, substantially as shown and described, whereby the pendulum is vibrated until the weight has descended, when an electric circuit is formed by contact of the rack-lever and armature-arm, thus causing the armature to swing and carry the lever and weight back to their starting-place and break the circuit, so that the armature resumes its normal position and the weight begins to fall again, as specified.

4. In an electrical clock-winding apparatus, the combination, with the two electro-magnets arranged vertically parallel and forming part of an electric circuit, of a bar-armature fixed horizontally on a vertical shaft between their poles, a retracting-spring coiled about the said shaft and serving to hold the armature normally out of alignment with the magnetic poles, the vertically-swinging segmental rack-lever, and a weight fixed on the same horizontal axis, the said lever having a lateral portion provided with a non-conducting piece, an escape mechanism, a pendulum, dial-shaft, means for connecting the shaft and pendulum with the lever, and a curved arm attached to the armature and extending normally around the pendulum-rod, so that its free end is in position to engage the lateral portion of the rack-lever when thrown over by the weight reaching the limit of its downward movement, substantially as shown and described.

In testimony whereof I have signed my name to this specification in the presence of two subscribing witnesses.

HEINRICH RABE.

Witnesses:
FRANZ HASSLACHER,
JOSEPH PATRICK.